Aug. 25, 1931.   J. W. COOPER   1,820,692
SNOW SHOVEL
Filed May 12, 1930
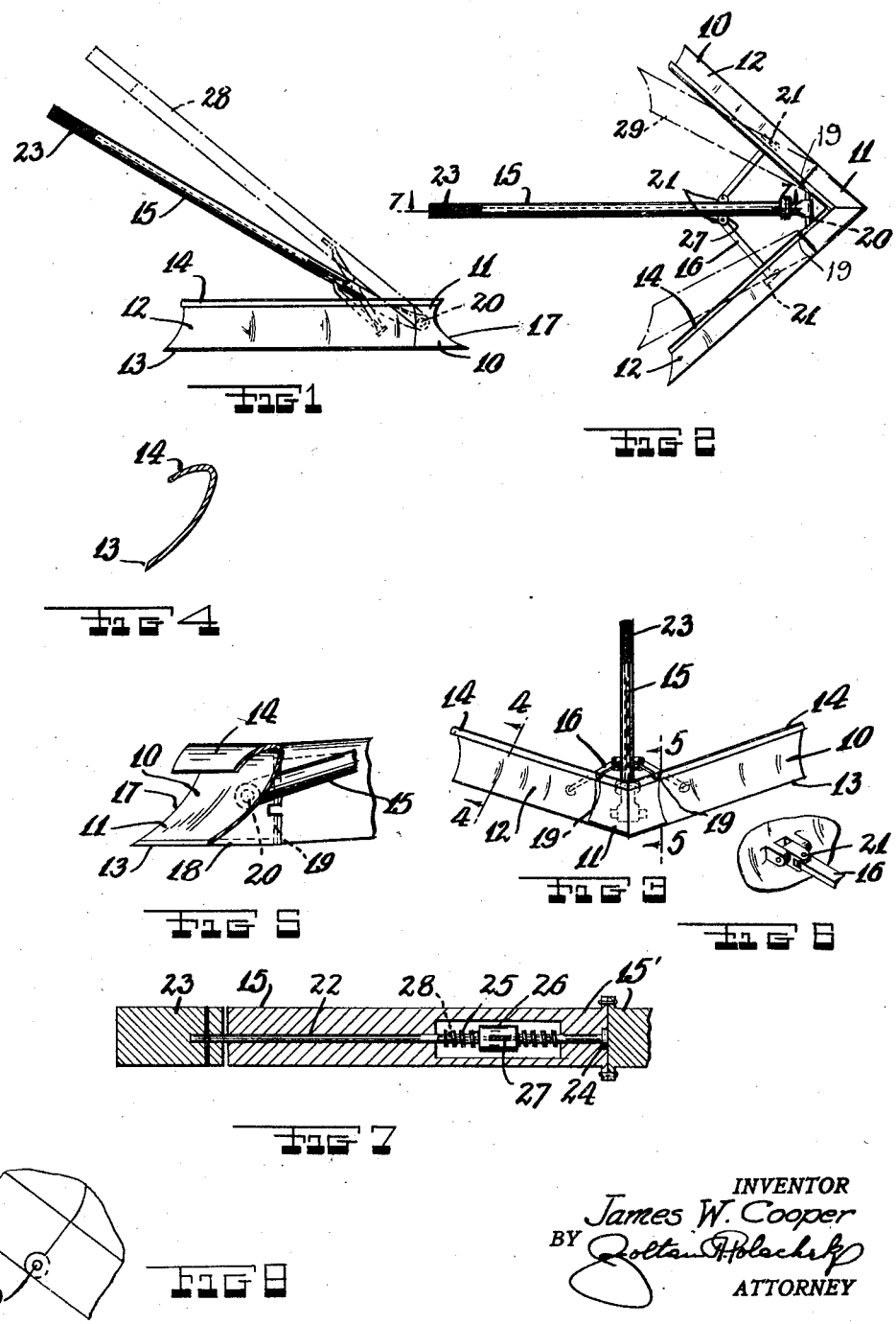
INVENTOR
James W. Cooper
BY
ATTORNEY Patented Aug. 25, 1931

1,820,692

UNITED STATES PATENT OFFICE

JAMES W. COOPER, OF HADDON HEIGHTS, NEW JERSEY

SNOW SHOVEL

Application filed May 12, 1930. Serial No. 451,601.

This invention relates to new and useful improvements in a snow shovel.

The invention has for an object the provision of a device of the class mentioned which is of simple durable construction, dependable in use and efficient in action, and which can be manufactured and sold at a reasonable cost.

The invention proposes a shovel head with a front point member and side forming members hinged on the front point to pivot on the horizontal only, said side forming members diverging rearwards and including a sharp bottom edge and a downturned top edge, a handle pivotally connected at its front point for moving in the vertical only, a connecting brace between each side forming member and said handle for changing the diverging angle of said side forming member upon upward or downward pivoting, and means for adjusting the positions of the ends of the braces connecting with said handle for adjustments of said angles of divergence.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a shovel constructed according to this invention.

Fig. 2 is a plan view of Fig. 1.

Fig. 3 is a front elevational view of the shovel shown in Fig. 1.

Fig. 4 is an enlarged vertical sectional view taken on the line 4—4 of Fig. 3.

Fig. 5 is an enlarged vertical sectional view taken on the line 5—5 of Fig. 3.

Fig. 6 is a fragmentary perspective detailed view of one of the braces shown in Fig. 2.

Fig. 7 is an enlarged fragmentary detailed sectional view of the handle of the shovel.

Fig. 8 is a fragmentary enlarged detailed view of a portion of Fig. 2.

The snow shovel comprises a shovel head 10 with a front pointed member 11 and side forming members 12 hinged on the front point to pivot in the horizontal only, said side forming members diverging rearwards and including sharp bottom edges 13 and a downturned top edge 14, a handle 15 pivotally connected at its front end on the rear of said front point for moving in the vertical only, a connecting brace 16 between each side forming member 12 and said handle 15 for changing the diverging angle of said side forming member upon upward or downward pivoting, and means for adjusting the positions of the ends of the braces connecting said handles for adjustments of said angles of diverging.

The point member 11 and the members 12 have their bottom edges on one horizontal plane so as to be capable of resting upon the ground and being forced along the ground as hereinafter further described. The front point member 11 has an inward curved front edge 17 for cutting the snow when the shovel is moved along the ground and separating the snow into two sections, one moving along one side of the side forming members and the other along the other. The hinged connection of the side forming members upon the point member 11 is accomplished by small wall sections 18 integral with the point 11 and side forming members and hinges 19 between these walls for accomplishing the pivoting. The hinges 19 comprise lugs projecting from said wall sections and a pintle rivet engaged through these lugs. These hinges are of the type which allow pivoting in one plane only, namely the horizontal plane. The downturned top edges 14 of the side forming members serve to direct snow downwards which may rise up along the side forming members when the shovel is moved forwards.

The pivotal connection of the handle 15 with the front point member 11 is accomplished by a horizontal pin 20 so that the handle 15 is limited to pivoting in a vertical plane only. The manner of connecting the braces 16 with the side forming members 12 includes the use of universal joints 21. One of these joints is shown in detail in Fig. 6 and constitutes merely a link arranged for pivoting in the vertical and connecting with another section of the brace, capable of pivoting in the horizontal. The ends of the braces 16 which connect with the handle 15 are also provided with universal joints 21 very similar to the construction just mentioned.

The means for adjusting the positions of the ends of the braces which connect with the said handle 15 constitutes a rod 22 extended thru the handle 15 and firmly connected with a head member 23 on the outer end of the handle and rotatively mounted within the handle 15 preferably by a head portion 24 disposed between secured together sections 15', constituting the handle 15. A portion of the rod 22 is threaded as indicated by reference numeral 25 and threadedly engages a follower 26 provided with lateral lugs 27 extending thru longitudinal slots 28 in the sides of the handle 15. The braces 16 are connected upon the lugs 26 so that when the handle 23 is rotated the position of the braces is adjusted.

When the shovel is forced along the ground forwards by the handle 15, it serves to clear away snow. This snow is shoved to the sides. The pointed member 11 constitutes a cutting edge to divide the snow into two sections which are moved to opposite sides. The downturned edges 14 of the side forming members prevent the snow from moving over the tops of the side forming members and to the rear of the shovel, and limit the motion of the snow laterally to the sides of the side forming members. The handle 15 may be pivoted in the vertical as indicated by dot and dash lines 28 in Fig. 1 so as to separate or move the side forming members together as indicated by the reference numeral 29 in Fig. 2. When the handle is moved upwards, the braces 16 are drawn together so as to pivot the side forming members inwards upon the hinges 19. When the handle is lowered the side forming members moved outwards. For adjusting the natural spread of the side forming members it is merely necessary to rotate the head member 23 so as to adjust the position of the follower 26.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A snow shovel comprising a shovel head with a front point member and side forming members hinged on the front point to pivot on the horizontal only, said side forming members diverging rearwards and including a sharp bottom edge and a horizontal top edge, a handle pivotally connected at its front end on the rear of said front point for moving in the vertical only, a connecting brace between each side forming member and said handle for changing the diverging angle of the side forming member upon upward or downward pivoting, and means for adjusting the positions of the ends of the braces connecting with said handle for adjustments of said angle of divergence.

2. A snow shovel comprising a shovel head with a front point member and side forming members hinged on the front point to pivot on the horizontal only, said side forming members diverging rearwards and including a sharp bottom edge and a horizontal top edge, a handle pivotally connected at its front end on the rear of said front point for moving in the vertical only, a connecting brace between each side forming member and said handle for changing the diverging angle of the side forming member upon upward or downward pivoting, and means for adjusting the positions of the ends of the braces connecting with said handle for adjustments of said angle of divergence, the hinged connection between the front point member and the side forming members being accomplished by walls on adjacent ends of these parts and hinges connected on these walls.

3. A snow shovel comprising a shovel head with a front point member and side forming members hinged on the front point to pivot on the horizontal only, said side forming members diverging rearwards and including a sharp bottom edge and a horizontal top edge, a handle pivotally connected at its front end on the rear of said front point for moving in the vertical only, a connecting brace between each side forming member and said handle for changing the diverging angle of the side forming member upon upward or downward pivoting, and means for adjusting the positions of the ends of the braces connecting with said handle for adjustments of said angle of divergence, all of the ends of said braces being provided with universal joints for their connections with the handle and the side forming members.

4. A snow shovel comprising a shovel head with a front point member and side forming members hinged on the front point to pivot on the horizontal only, said side forming members diverging rearwards and including a sharp bottom edge and a horizontal top edge, a handle pivotally connected at its front end on the rear of said front point for moving in the vertical only, a connecting brace between each side forming member and said handle for changing the diverging angle of the side forming member upon upward or downward pivoting, and means for adjusting the positions of the ends of the braces connecting with said handle for adjustments of said angle of divergence, comprising a rod extended thru the handle and attached to a head member and rotatively mounted within the handle, and a follower threadedly engaged upon said rod and provided with lugs projecting thru elongated slots in the handle, and the inner ends of said braces being attached upon said lugs.

5. A snow shovel comprising a shovel head with a front point member and side forming members hinged on the front point to pivot on the horizontal only, said side forming members diverging rearwards and including a sharp bottom edge and a horizontal top edge, a handle pivotally connected at its front end on the rear of said front point for moving in the vertical only, a connecting brace between each side forming member and said handle for changing the diverging angle of the side forming member upon upward or downward pivoting, and means for adjusting the positions of the ends of the braces connecting with said handle for adjustments of said angle of divergence, comprising a rod extended thru the handle and attached to a head member at one end and rotatively mounted within the handle and having an enlarged portion at the other end, and a follower threadedly engaged upon said rod and provided with lugs projecting thru elongated slots in the handle, and the inner ends of said braces being attached upon said lugs, said handle being made of two sections secured together for rotatively holding the enlarged portion of the rod so as to provide for the rotatable mounting of the rod.

In testimony whereof I have affixed my signature.

JAMES W. COOPER.